US012667110B2

(12) United States Patent
Van Gerwen

(10) Patent No.: US 12,667,110 B2
(45) Date of Patent: Jun. 30, 2026

(54) POROUS MOULD DRUM FOR POULTRY, PORK, MEAT-REPLACEMENT AND VEGETARIAN FOOD

(71) Applicant: GEA FOOD SOLUTIONS BAKEL B.V., Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 216 days.

(21) Appl. No.: 18/557,345

(22) PCT Filed: May 3, 2022

(86) PCT No.: PCT/EP2022/061763
§ 371 (c)(1),
(2) Date: Oct. 26, 2023

(87) PCT Pub. No.: WO2022/233817
PCT Pub. Date: Nov. 10, 2022

(65) Prior Publication Data
US 2024/0215591 A1    Jul. 4, 2024

(30) Foreign Application Priority Data

May 3, 2021    (EP) ..................................... 21171781
Aug. 19, 2021    (EP) ..................................... 21192039

(51) Int. Cl.
*A22C 7/00*          (2006.01)

(52) U.S. Cl.
CPC .......... *A22C 7/0069* (2013.01); *A22C 7/0038* (2013.01)

(58) Field of Classification Search
CPC ............................. A22C 7/0069; A22C 7/0038
See application file for complete search history.

(56) References Cited

U.S. PATENT DOCUMENTS 3,427,649 A * 2/1969 Fay ...................... A23G 3/0284
264/297.6
4,212,609 A * 7/1980 Fay .......................... A21C 9/04
425/231
(Continued)

FOREIGN PATENT DOCUMENTS

CN          101444323 A      6/2009
CN          102164501 A      8/2011
(Continued)

OTHER PUBLICATIONS

International Search Report and Written opinion dated Feb. 15, 2023, for International Application PCT/EP2022/061763.
(Continued)

*Primary Examiner* — Seyed Masoud Malekzadeh
(74) *Attorney, Agent, or Firm* — The Dobrusin Law Firm, P.C.

(57)          ABSTRACT

A rotary cylindrical mould member for moulding products from a food starting material having at least one mould body having a curved outer surface, the at least one mould body is made from a porous material with a porous structure of intercommunicating pores, the outer circumference is at least partially sealed airtight, the at least one mould body has at least one mould cavity formed in the curved outer surface and having at its porous bottom wall and/or its porous sidewall and/or its boundary a deformation layer formed by plastic deformation from a milling operation, the mould member having a gas supply which forces a fluid gas through the inner volume and the deformation layer into the at least one cavity to assist the removal of moulded products, an average flow resistance of the deformation layer is 1-30% of the average flow resistance of the inner volume.

13 Claims, 5 Drawing Sheets

(56)                References Cited

U.S. PATENT DOCUMENTS

| | | | | |
|---|---|---|---|---|
| 4,957,425 | A * | 9/1990 | Fay | B30B 11/12 |
| | | | | 425/362 |
| 7,819,650 | B2 * | 10/2010 | Meskendahl | A22C 7/0069 |
| | | | | 425/436 R |
| 7,931,461 | B2 * | 4/2011 | van der Eerden | A22C 7/0069 |
| | | | | 425/374 |
| 8,371,836 | B2 * | 2/2013 | van der Eerden | A22C 7/0069 |
| | | | | 425/365 |
| 8,747,934 | B2 * | 6/2014 | Meskendahl | B08B 1/34 |
| 9,060,544 | B2 * | 6/2015 | Meskendahl | A22C 7/0038 |
| 9,162,375 | B2 * | 10/2015 | Van Gerwen | B08B 3/04 |
| 9,380,790 | B2 * | 7/2016 | Van Gerwen | A23L 13/00 |
| 9,439,443 | B2 * | 9/2016 | Van Gerwen | A23P 30/10 |
| 9,474,286 | B2 * | 10/2016 | Van Der Eerden | A23P 30/10 |
| 9,533,784 | B2 * | 1/2017 | Van Gerwen | B65B 1/366 |
| 9,545,113 | B2 * | 1/2017 | Spierts | A22C 11/08 |
| 9,637,365 | B2 * | 5/2017 | Van Gerwen | A22C 7/0076 |
| 9,730,467 | B2 * | 8/2017 | Van Gerwen | A22C 7/0038 |
| 9,737,080 | B2 * | 8/2017 | Meulendijks | A22C 7/0069 |
| 9,775,375 | B2 * | 10/2017 | Van Esbroeck | A22C 17/0006 |
| 9,788,554 | B2 * | 10/2017 | Van Zoelen | A22C 7/00 |
| 9,944,504 | B2 * | 4/2018 | Van Gerwen | B08B 9/023 |
| 9,949,493 | B2 * | 4/2018 | Van Gerwen | F04C 2/3441 |
| 9,986,755 | B2 * | 6/2018 | Meskendahl | B08B 1/34 |
| 10,182,575 | B2 * | 1/2019 | Van Gerwen | A21C 5/003 |
| 10,238,122 | B2 * | 3/2019 | Van Gerwen | A22C 7/0069 |
| 10,370,229 | B2 * | 8/2019 | Van Gerwen | B29C 33/72 |
| 10,398,165 | B2 * | 9/2019 | Van Gerwen | A23P 30/10 |
| 10,537,113 | B2 * | 1/2020 | Van Gerwen | A21C 11/02 |
| 10,537,114 | B2 * | 1/2020 | Van Gerwen | A22C 7/0084 |
| 10,609,933 | B2 * | 4/2020 | Verhoeven | A22C 7/0069 |
| 10,631,565 | B2 * | 4/2020 | Meulendijks | A22C 7/0038 |
| 10,736,329 | B2 * | 8/2020 | Van Gerwen | A22C 7/0069 |
| 10,828,806 | B2 * | 11/2020 | Lindee | A22C 7/0069 |
| 10,842,158 | B2 * | 11/2020 | Verouden | B08B 7/0085 |
| 10,856,555 | B2 * | 12/2020 | Van Gerwen | A23P 30/10 |
| 10,893,678 | B2 * | 1/2021 | Van Gerwen | A21C 5/003 |
| 10,905,131 | B2 * | 2/2021 | Van Der Eerden | A23P 30/10 |
| 11,166,470 | B2 * | 11/2021 | Van Gerwen | A23L 13/00 |
| 11,395,499 | B2 * | 7/2022 | Van Gerwen | A22C 7/0084 |
| 11,412,746 | B2 * | 8/2022 | Van Gerwen | A22C 7/0069 |
| 11,412,773 | B2 * | 8/2022 | Van Gerwen | A22C 7/0069 |
| 12,108,769 | B2 * | 10/2024 | Van Gerwen | A22C 7/0076 |
| 2007/0224305 | A1 * | 9/2007 | Meskendahl | A23P 30/10 |
| | | | | 425/436 R |
| 2009/0134308 | A1 * | 5/2009 | van der Eerden | A23P 30/10 |
| | | | | 419/2 |
| 2009/0134544 | A1 * | 5/2009 | Van Der Eerden | A22C 7/0038 |
| | | | | 264/109 |
| 2011/0014344 | A1 * | 1/2011 | Meskendahl | B08B 1/34 |
| | | | | 425/169 |
| 2012/0003374 | A1 * | 1/2012 | Van Der Eerden | A23P 30/10 |
| | | | | 426/513 |
| 2013/0273192 | A1 * | 10/2013 | Van Gerwen | B66F 9/187 |
| | | | | 425/317 |
| 2013/0291483 | A1 * | 11/2013 | Van Gerwen | A22C 7/0069 |
| | | | | 53/113 |
| 2013/0337128 | A1 * | 12/2013 | Van Gerwen | A22C 7/0038 |
| | | | | 156/60 |
| 2014/0242234 | A1 * | 8/2014 | Meskendahl | B08B 1/34 |
| | | | | 426/512 |
| 2014/0295018 | A1 * | 10/2014 | Van Der Eerden | A23P 30/10 |
| | | | | 425/374 |
| 2014/0342072 | A1 * | 11/2014 | Van Gerwen | A22C 7/0076 |
| | | | | 425/239 |
| 2015/0208674 | A1 * | 7/2015 | Van Zoelen | A22C 7/0069 |
| | | | | 425/441 |
| 2015/0282520 | A1 * | 10/2015 | Meskendahl | A23P 30/10 |
| 2015/0343671 | A1 * | 12/2015 | Van Gerwen | A23P 30/10 |
| | | | | 134/167 R |
| 2015/0344275 | A1 * | 12/2015 | Van Gerwen | B30B 11/18 |
| | | | | 414/800 |
| 2015/0359231 | A1 * | 12/2015 | Van Gerwen | A22C 7/0069 |
| | | | | 425/331 |
| 2016/0302430 | A1 * | 10/2016 | Van Gerwen | A22C 7/0076 |
| 2016/0302470 | A1 * | 10/2016 | Van Gerwen | A22C 7/0084 |
| 2016/0324208 | A1 * | 11/2016 | Van Gerwen | A22C 7/0076 |
| 2017/0142987 | A1 * | 5/2017 | Van Gerwen | A22C 7/0069 |
| 2018/0213805 | A1 * | 8/2018 | Van Gerwen | F01C 21/0836 |
| 2018/0213806 | A1 * | 8/2018 | Van Gerwen | A22C 7/0069 |
| 2018/0215596 | A1 * | 8/2018 | Van Gerwen | B66F 9/07559 |
| 2018/0255824 | A1 * | 9/2018 | Meskendahl | B08B 1/34 |
| 2019/0053498 | A1 * | 2/2019 | Van Gerwen | A21C 5/003 |
| 2019/0053499 | A1 * | 2/2019 | Van Gerwen | A22C 7/0069 |
| 2019/0082702 | A1 * | 3/2019 | Verouden | B08B 7/0085 |
| 2019/0116813 | A1 * | 4/2019 | Verhoeven | B08B 9/00 |
| 2019/0166854 | A1 * | 6/2019 | Van Gerwen | A22C 7/0069 |
| 2019/0183162 | A1 * | 6/2019 | Meulendijks | A22C 7/0038 |
| 2020/0037621 | A1 * | 2/2020 | Van Gerwen | A22C 7/0076 |
| 2020/0113194 | A1 * | 4/2020 | Van Gerwen | A23P 30/10 |
| 2020/0113195 | A1 * | 4/2020 | Van Gerwen | A23P 30/10 |
| 2020/0163348 | A1 * | 5/2020 | Verhoeven | B08B 9/00 |
| 2021/0051966 | A1 * | 2/2021 | Verouden | A22C 7/0069 |
| 2021/0092962 | A1 * | 4/2021 | Van Gerwen | A22C 7/0069 |
| 2022/0338527 | A1 * | 10/2022 | Van Gerwen | A22C 7/0084 |

FOREIGN PATENT DOCUMENTS

| | | |
|---|---|---|
| CN | 106061271 A | 10/2016 |
| CN | 109890212 A | 6/2019 |
| CN | 110087473 A | 8/2019 |
| WO | 2018/034568 A1 | 2/2018 |
| WO | 2020/171697 A1 | 8/2020 |

OTHER PUBLICATIONS

International Preliminary Report on Patentability dated Aug. 11, 2023, for International Application PCT/EP2022/061763.
Chinese First Office Action Dated Jul. 7, 2025, for Chinese Application CN2022800328131.

* cited by examiner

<u>Determination of the linear porosity and the linear pore intercept length</u>

$$\text{Linear porosity} = \frac{\text{Sum length pores}=L1+L2+L3+L4+L5+L6+L7+L8}{\text{Total measuring length}} \times 100\%$$

$$\begin{array}{c}\text{Average linear} \\ \text{intercept L} \\ \text{[micron]}\end{array} = \frac{\text{Sum length pores}=L1+L2+L3+L4+L5+L6+L7+L8}{\text{Number of pores}=8}$$

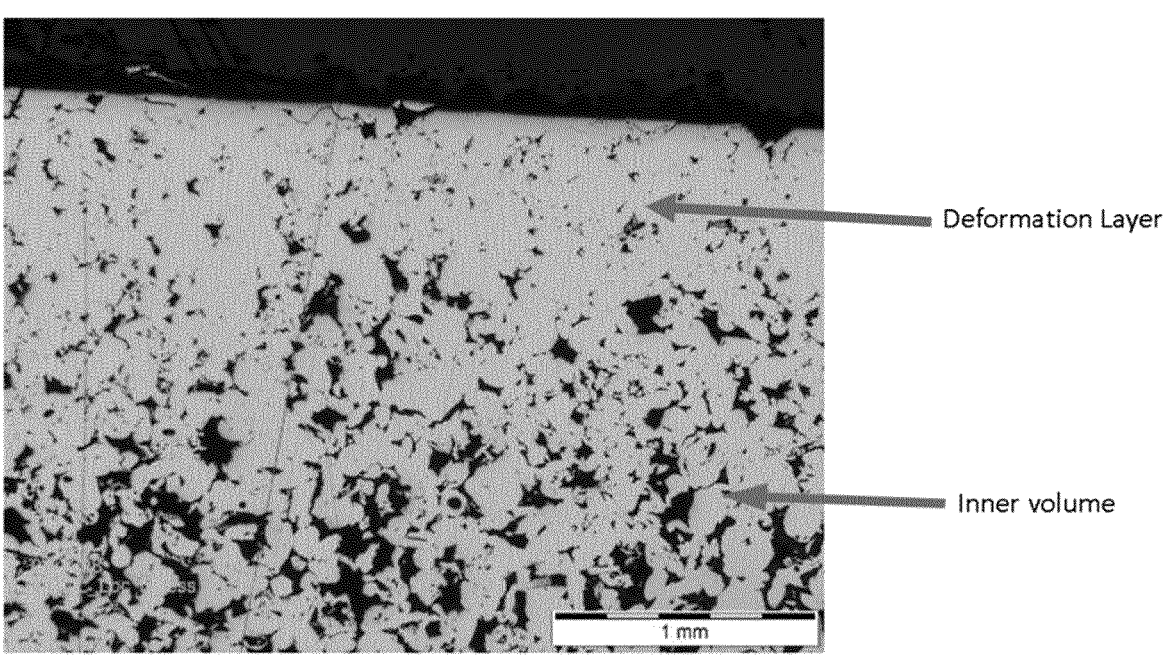
Fig. 5
Fig. 6
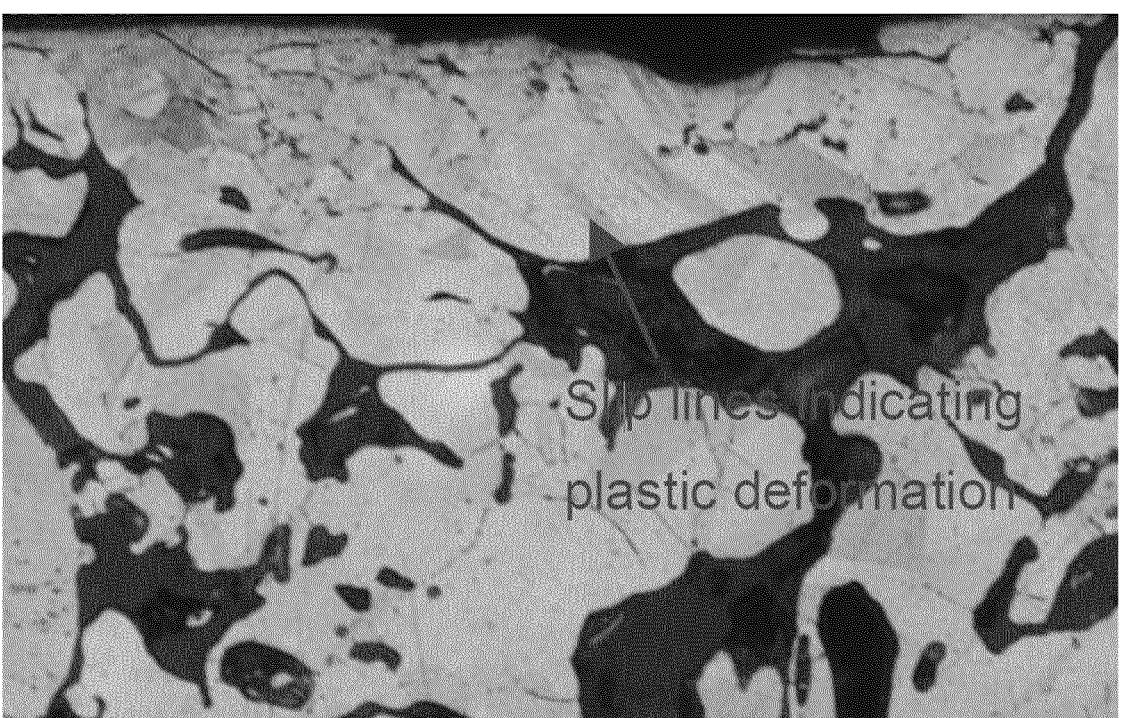

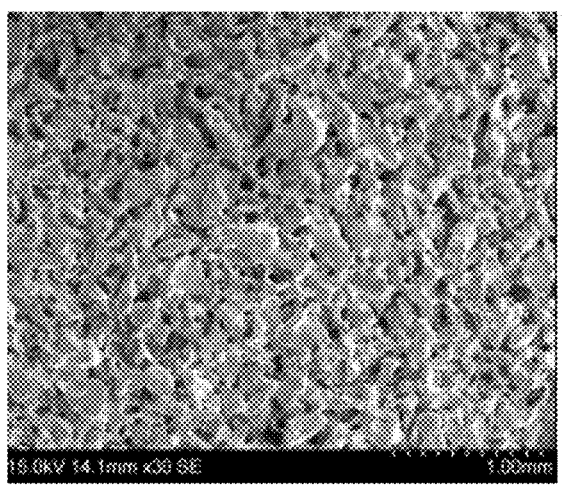
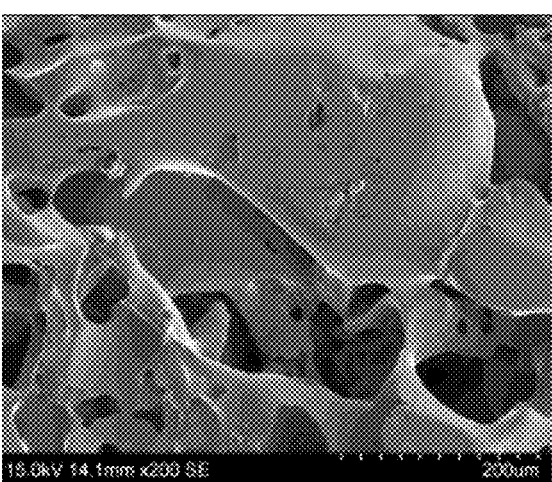
Fig. 7A                    Fig. 7B

POROUS MOULD DRUM FOR POULTRY, PORK, MEAT-REPLACEMENT AND VEGETARIAN FOOD

CROSS-REFERENCE TO RELATED APPLICATIONS

This application is a US National Stage Entry of PCT/EP2022/061763 filed on May 3, 2022, which claims priority to EP 21171781.4 filed May 3, 2021 and to EP 21192039.2 filed Aug. 19, 2021.

FIELD

The present invention relates to a rotary cylindrical mould member for moulding products from a food starting material comprising poultry, pork and/or a meat-replacement material, the mould member having a longitudinal axis and an outer circumference, comprising at least one mould body having a curved outer surface, forming at least part of the outer circumference of the mould member and an opposite inner surface, wherein the mould body is made from a porous material with a porous structure of intercommunicating pores, wherein the outer circumference is at least partially sealed airtight, wherein each mould body comprises at least one cavity in which the food starting material is moulded, the cavities being formed in the curved outer surface, are defined by a boundary comprising walls and base, the cavities comprising at its porous bottom wall and/or its porous sidewall and/or its curved/contoured boundary a deformation layer formed by plastic deformation, the mould body comprises an inner volume of the mould body provided between the deformation layer and the inner surface, the mould member further comprising a gas supply which forces a gas through the inner volume and the deformation layer into the cavities to assist the removal of moulded products from the mould cavity. The present invention also relates to a method to provide a cavity in a porous mould body.

BACKGROUND

A mould member is for example known from WO 2018/034568. But, from what a skilled person may be able to understand with any degree of certainty, the mould drum published is limited in its utility, is not suitable for poultry, pork, meat-replacement and vegetarian food and the principle of operation of the disclosed drum poses obstacles to reproducibility.

SUMMARY

It was therefore the problem of the present invention to provide a mould drum which is straightforward in its operation and does not comprise the deficiencies of the drums according to the state in the art.

The problem is overcome with a rotary cylindrical mould member for moulding products from a food starting material comprising poultry, pork, meat-replacement and vegetarian food. The mould member has a longitudinal axis and an outer circumference, comprising at least one mould body having a curved outer surface and forming at least part of the outer circumference of the mould member and an opposite inner surface. The mould body is made from a porous material with a porous structure of intercommunicating pores. The outer circumference of the mould member is at least partially sealed airtight. Each mould body comprises at least one cavity in which the food starting material is moulded. The cavities are formed, preferably milled, in the curved outer surface of the mould body. Each cavity is defined by a boundary comprising one or more sidewall(s) and a bottom wall. Each cavity comprises, at its porous bottom wall and/or its porous sidewall and/or its boundary, a deformation layer formed by plastic deformation for example due to the milling process. The mould body comprises an inner volume provided between the deformation layer and the inner surface. The deformation layer may extend into the inner volume from an exposed surface of the side wall, the bottom wall, and/or the boundary.

The mould member may further comprise a gas supply which forces a gas through the inner volume and the deformation layer into the cavities to assist the removal of moulded products from the mould cavity.

An average flow resistance of the deformation layer is envisioned to be different than an average flow resistance of the inner volume. For instance, the average flow resistance of the deformation layer is envisioned to be different than (higher or lower than) the average flow resistance of the inner volume. The amount by which the average flow resistance of the deformation layer differs from that of the inner volume may exceed 30%, more preferably 40% and more preferably 50%. Thus, for example, if the inner volume has an average flow resistance of X, then the deformation layer average flow resistance may be less than the product of $0.7(X)$, more preferably $0.5(X)$, or even more preferably $0.3(x)$. The ratio of the inner volume average flow resistance to the deformation layer average flow resistance may be higher than 3:1, more preferably higher than 5:1, still more preferably higher than 8:1, and even more preferably higher than 10:1. It is possible that the ratio of the inner volume average flow resistance to the deformation layer average flow resistance may be less than 100:1 or more preferably less than 50:1. The average flow resistance of the deformation layer may be, for example, 1-30%, preferably 3-20%, more preferably 4-15%, even more preferably 5-12%) of the flow resistance of the inner volume.

Unless otherwise specified (e.g., in a comparison of flow resistance between that of a side wall and that of a bottom wall), the flow resistance is averaged over one cavity; i.e. no differentiation is made between the flow resistance of the sidewall and the bottom wall.

Regarding all measured material properties or characteristics described herein, the "average" is determined by taking at least N(N is an integer greater than 1) samples at different representative locations, adding the measured results and dividing the sum by the number of samples N (e.g., divide the sum of measured values by 2, 3 or 5 for a sampling N (respectively) of 2, 3 or 5 samples).

The disclosure regarding this embodiment of the present invention also apply for the other embodiments and vice versa. Subject matter disclosed in context with this embodiment of the present invention can be included in other embodiments and vice versa.

The present invention relates to a rotary cylindrical mould member, preferably a drum for moulding products from a food starting material, and more preferably, a drum for moulding products from a food starting material commonly regarded as having a low fat content. For instance, the present invention contemplates a rotary cylindrical mould member, preferably a drum for moulding products from a food starting material having an amount of fat that is less than or equal to 15, 12, 10 or 8 grams (g) per 100 g of uncooked food. The food starting material may comprise a food selected from the group consisting of poultry, pork, fish, meat-replacement and vegetarian food.

The mould member has a longitudinal axis and an outer circumference. During production, the mould member rotates around the longitudinal axis.

The mould member comprises at least one mould body having a curved outer surface, forming at least part of the outer circumference of the mould member and an opposite inner surface. The mould body can be one single piece, for example a drum, or can be segmented into a plurality of pieces. The mould body can be made from a porous material with a porous structure of intercommunicating pores, for example a sintered metal-, ceramic- or plastic-material. It may preferably be stainless steel. Portions of the outer circumference of the mould body can be at least partially, preferably totally, sealed airtight. For example, the outer circumference of the mould body can be selectively sealed at predetermined locations (e.g., in regions adjoining one or more cavities into which food starting material is introduced and moulded) about the outer circumference of the mould body.

Each mould body comprises at least one cavity, preferably a plurality of cavities in which the food starting material is moulded. The cavities are formed, for example by material removal (e.g., by milling), in the curved outer surface of the mould body (e.g., removing material before or after the outer circumference of the mould body is sealed). Each cavity comprises a preferably porous sidewall and/or a preferably porous bottom wall. The sidewall(s) and the bottom wall define the boundary of the cavity. The boundary is conventionally curved and/or contoured. It may, however, include one or more planar portions (e.g., a bottom wall of a cavity, such as a 2-D cavity).

The mould body can comprise an inner volume of porous material with or without a structure that defines a plurality of channels. The porous material of the inner volume may include a network of adjoining and interconnected open pores that permit a gas to pass through the network. The porous material of the inner volume may include a generally homogeneous distribution of pores.

The pores of the inner volume may have a dimension (i.e., in its largest dimension, such as a diameter) by which the variation in dimension of the pores is such that at least 50% of the pores or at least 75% of the pores differ from each other in their largest dimension by less than 30%, less than 20% or less than 10%.

The sidewall may have any shape, for example a circular or elliptical shape. The bottom may be curved/contoured or comprises any other 2D- or 3D-shape. Each cavity comprises at its porous bottom wall and/or its porous sidewall and/or its boundary a deformation layer formed by plastic deformation. The deformation layer is typically formed during milling of the cavity into the porous material. For instance, the deformation layer may arise within a subsurface portion of the mould drum (during its manufacture) that extends from the cavity wall surface exposed by a material removal operation, e.g., milling, such as conventional milling, zig-zag milling, and/or climb milling. Such sub-surface deformation in such locations may be induced as a result of cutting forces (e.g., friction and/or shear), increased temperatures or both that occur during a machining operation.

The deformation layer can be manifested as a sub-surface region that extends from an exposed cavity wall surface into (e.g., radially and/or longitudinally) a portion of the inner volume. However, it may differ in microstructure relative to the typical microstructure that is found within the inner volume.

The deformation layer may exhibit an average material density that exceeds the average material density (e.g., by at least 10%, 20%, 30% or 40%) within the inner volume. The average porosity within the deformation layer may be at least 10%, 20%, 30%, or 40% lower than the average porosity within the inner volume. Accordingly, the deformation layer may be detectable using the linear intercept method.

Depending upon the technique employed for material removal, it may be possible that within the deformation layer there is an average chemical composition and/or metallurgical phases (or amounts of phases) that differ from that found in the inner volume.

The deformation layer may exhibit the presence of metallographically detectable (e.g., by use of scanning electron microscopy (SEM)) twinning, slip lines, and/or phase differences not found in kind and/or degree within the inner volume.

The deformation layer may exhibit a microstructure (as analyzed by the linear intercept method) that has a lower concentration of voids per unit volume relative to an adjoining region, and/or a gradient of number or volume of voids as compared with a region more remotely positioned from the material removal site.

The deformation layer may exhibit a microstructure (as analyzed by the linear intercept method) that has a lower concentration of open pores per unit volume relative to an adjoining region, and/or a gradient of number or volume of voids as compared with a region more remotely positioned from the material removal site.

The deformation layer may exhibit a different average pore size (e.g., a lower average pore size) than that of the inner volume, as measured by the linear intercept method. The average pore size (across the thickness of the deformation layer orthogonal to the exposed cavity wall surface) may be at least 10%, 15%, 20%, 40% or 60% different from (e.g., lower than) the average pore size within the inner volume. For example, the average pore size taken at N (as defined earlier) different representative locations across the thickness of the deformation layer, may be at least 10%, 15%, 20%, 40% or 60% different from (e.g., lower than) the average pore size taken at N different representative locations of a cross-section within the inner volume.

The deformation layer may have an average thickness of more than 30 microns, 50 microns, 70 microns, 85 microns, 100 microns, or 200 microns. The deformation layer may have an average thickness of less than 500 microns, 425 microns, 350 microns, or 275 microns.

The mould body thus may comprise an inner volume of porous material, provided between the deformation layer and the inner surface. Thickness of the deformation layer is measured from the exposed outer cavity surface inward (e.g., toward the inner volume).

At the circumference of the cylindrical mould member, more than one cavity is provided in a row, which preferably extends parallel to the axis of rotation of the cylindrical mould member. However, the row may also be provided at an angel relative to the axis of rotation. The cylindrical mould member preferably comprises more than one row, for example 2-12 rows, wherein during production, each row is simultaneously filled with the food mass material and the cavities in one row are emptied simultaneously. The shape of the cavities in one row may vary. The shape and number of the cavities may also vary between two rows.

The mould member further comprises or is fluidly connected with a gas supply which forces a gas through the inner volume (e.g., via the porous structure and/or channels configured therein) and the deformation layer into the cavities to assist the removal of moulded products from the mould cavity. The gas is typically air or nitrogen.

Via at least the porous structure of the mould member, the cavities can be vented during filling.

The mould member is preferably a mould drum, in which the food mass is moulded and which rotates around its longitudinal axis. After moulding, the moulded product is removed from the cavity and the cavity can be refilled. The cavity can be defined within a totally or partially porous material (for example a sintered material or a pressed (e.g., hot pressed or isostatically pressed) material such as plastic, ceramic or metal, preferably a ferrous material that contains molybdenum, nickel, chromium or both, such as a ferritic, austenitic and/or martensitic stainless steel. Via this porous material, the moulded products can be ejected with a gas (or other fluid) and/or the during filling the cavities can be vented via the porous material, such as by flowing a fluid through pores in the porous material.

During production, the drum turns continuously or intermittently and in one position the product cavities in one row are filled with the food mass and in a downstream position, the moulded food mass is discharged from the product cavities, located in one row. In case the row is provided at an angle, the cavities in one row are filled partially or totally subsequently. Thereafter, the product cavities in one row of cavities can be filled again and so on. In order to vent the product cavities before and/or during and/or after their filling and/or in order to support the discharge of the product, the product cavities are at least partially, preferably entirely, made of a porous material, for example sintered metal, sintered ceramic, or plastic, which is gas-permeable and via which the product cavity can be vented or through which gas, for example air, can be discharged, to loosen the moulded product from the surface of the product cavity. Preferably, the porous material comprises pores (and optional channels), which are interconnected to each other. The food moulding drum further preferably comprises fluid passages, which extend (in a straight manner, a helical manner, or otherwise) preferably in the longitudinal direction of the drum, i.e. parallel or at an angle to the center axis of the drum and extend preferably from one end to the other end of the drum. Via each fluid passage, ventilation fluid (e.g., a gas such as air, nitrogen or other gas) can be discharged during filling of the cavities for example to the ambient, and/or compressed gas can be forced into the cavities to discharge the moulded product. Additionally, a cleaning fluid can be forced through the passages and/or pores (and optional channels) of the porous material of the product cavities.

Before, during and/or after filling the cavity with food mass the cavity will be enclosed with seal member, for instance a seal plate, such that no undesirable leakage of mass occurs. This sealing member sealingly cooperates with the surface of the mould member, for example with the outer circumference of the mould drum. The seal member is preferably a seal plate whose length preferably extends over the entire axial length of the drum. In circumferential direction, the seal plate preferably covers the circumferential length of one cavity. However more preferably, the seal plate is longer than the circumferential length of the cavity in one row. Preferably, the seal plate comprises an opening, preferably a slot, that preferably extends over the entire axial length of the drum. Via this opening, the mould cavities are filled with the food mass. Preferably, the seal member is flexible (in material property, and/or as a structure) so that it upon applying a load it can elastically deform (and thereafter return to its pre-load application shape) and compensate for irregularities at the surface of the drum and/or so that a gap between the seal member and the surface of the mould member can be established, preferably due to the pressure of the gas to be vented. More preferably the seal member is pressed, at least locally, against the surface of the mould member.

Typically, the cavities are formed by removing material from the porous mould body. The cavities may be machined into the porous mould body, for example by milling, preferably climb-milling, conventional-milling and/or zig-zag-milling (alternate climb milling and conventional milling). In case of a 2D-cavity the final surface milling step of the bottom wall of a cavity will preferably be zig-zag-milling and the sidewall of the cavity will preferably be subject to material removal by climb-milling and/or conventional-milling. In case of a 3D-cavity, the sidewalls can be subject to material removal in a final surface milling step preferably be milled by conventional-milling. The sidewall of the cavity may have one or more sloping surfaces relative to a wall defining the bottom of the cavity. The sidewall of the cavity may have an angle of 10-90° relative a plane intersecting the bottom-most location of the cavity. Though less preferred, material removal may be by other techniques, such as spark erosion.

The bottom wall may be plane, curved or contoured. In case of a 2D-cavity the bottom wall is preferably curved with a radius which is preferably the radius of the outer circumference of the drum minus the depth of the cavity. This results in a product with an at least essentially constant thickness. In case of a 3D-cavity the bottom wall is contoured the bottom wall and sidewall will merge into each other. This results in a product whose thickness varies over its length and/or width.

During the machining process, preferably the deformation layer is formed, wherein the machining tool deforms a portion of the porous structure of the mould member. The inner volume has the porous structure of the mould body prior to machining. The flow resistance of the deformed layer is preferably higher (e.g., per unit length radiating outward away from the inner surface of the mould member toward a cavity bottom wall, per unit length within the inner volume longitudinally toward a side wall of a cavity, or both) than the flow resistance of the inner volume, because the porous structure is compressed/deformed during machining.

After machining, it may be necessary to remove all or part of the deformation layer in order to modify its flow resistance. This may be done by etching, electro polishing and/or spark erosion.

It may also be possible to modify flow resistance following a complete or partial removal of the deformation layer. For example, following a step of removing material that was in the deformation layer, a step of material addition may be employed. The material addition may be for adding an amount of material to an outer surface of one or more walls that define a cavity. The material added may include a polymer, a ceramic, and/or a metal. The material added may include a material having the same chemical composition as the porous structure of the mould member. The material added may include a material having a different chemical composition as the porous structure of the mould member, but which is selected to resist the formation of brittle corrosion by-products at portions of the resulting cavity surface that will contact food. The material added may be added by coating, dipping, spraying, swabbing, brushing, plating, chemical and/or physical vapor depositing, additive manufacturing (e.g., 3-dimensional printing) or otherwise. The material may be added in a manner to define a porous layer. The porous layer may have a flow resistance that is the same as or different from (e.g., smaller or larger than) a flow resistance of the inner volume.

During the flow through the inner volume and the deformation layer, the gas flow is subjected to a flow resistance. The average flow resistance of the deformation layer is envisioned to be different than the average flow resistance of the inner volume. Accordingly, it is possible to confirm a thickness of the deformation layer by measuring flow resistance (as described herein) following each of a succession of surface material removal steps of a cavity wall to a predetermined depth after which no more change of flow resistance is observed.

The average flow resistance of the deformation layer may differ in an amount greater than 25%, greater than 35% or greater than 45% of the average flow resistance of the inner volume. The average flow resistance of the deformation layer may be less than one half, or less than one third of the flow resistance of the inner volume. According to the present invention, the average flow resistance of the deformation layer can be up to 15, up to 20 or up to 30% of the flow resistance of the inner volume. It can be at least 1, at least 3 or at least 5% of the flow resistance of the inner volume. For example, it may be 1-30%, preferably 3-20%, more preferably 4-15%, even more preferably 5-12% of the flow resistance of the inner volume.

This inventive feature of the invention has an advantage that the total average flow resistance; i.e. the sum of the flow resistance of the deformed layer and the inner volume is relatively low so that the products can be ejected fast and with relatively low energy-consumption. The filling pressure of the product is relatively low and cleaning of the mould member is easier in comparison to the state in the art. The contribution of the deformed layer is low, but not too low, such that will be prevented that for example fat or juice can enter the pores of the inner volume.

The total average flow resistance ($FR_{Total}$) per cavity is calculated according to the following formula:

$$FR_{Total} = \Delta P/Q$$

wherein $\Delta P$ is the pressure drop [mbar] of the inner volume and the deformation layer and Q is the corresponding gas flowrate [ln/min]. The pressure drop is for example provided in [mbar]. Q is the gas flowrate at steady state conditions provided in [ln/min]. "ln" is a volume of a gas, preferably $N_2$ at standard condition (e.g. 0° C. and 1 bar).

For all flow resistance measurements, the cavities are empty and not filled with a food mass.

The total average flow resistance is preferably determined per cavity at a certain gas flowrate [ln/min], for example by measuring the pressure directly upstream from the inner volume and downstream the cavity, for example in the cavity. The cavity is preferably isolated such that no gas will leak away to prevent the measurement from being incorrect. The total average flow resistance is measured under steady state conditions, particularly at a constant gas flow rate. The total average flow resistance is the flow resistance of the inner volume and the deformation layer, of preferably one cavity. The pressure drop is preferably averaged over one cavity. In most cases it is sufficient to measure the pressure upstream from the inner volume, because downstream from the cavity, the pressure is at least essentially ambient pressure. The pressure drop is preferably averaged per cavity; i.e. over the sidewall and the bottom wall of one cavity. The pressure drop is for example determined in accordance with NEN-EN-ISO 4022-2006. The pressure drop is measured without a product inside the cavity.

The total flow resistance, $FR_{Total}$, of the deformation layer and the inner volume is calculated according to the following formula:

$$FR_{Total} = FR1 + FR2$$

Wherein FR1 is the flow resistance of the deformation layer and FR2 is the flow resistance of the inner volume at the same gas flowrate.

In order to determine the individual flow resistances FR1 and FR2, in a first step, the total flow resistance, $FR_{Total}$, at a certain gas flowrate [ln/min], or several gas flowrates [ln/min] is/are measured. Subsequently, the deformation layer is totally removed so that only the inner volume remains and then the flow resistance of the inner volume FR2 is measured at the same gas flow rate(s) [ln/min] as the gas flowrates used for the determination of $FR_{Total}$. Based on these measurements, FR1 can be calculated with the following formula:

$$FR1 = FR_{Total} - FR2.$$

The flow resistances are preferably measured in a range of 2-100 [ln/min], preferably 5-50 [ln/min]. The selected gas is preferably air or nitrogen.

The total removal of the deformation layer can, for example, be confirmed by comparing the porosity of the test piece with the porosity of the virgin material prior to machining the cavities into the porous material. This can for example be done preferably quantitatively, with a topographical image acquired by confocal microscopy and/or quantitatively by scanning electron microscopy (SEM). If, for example, the open surface porosity of both samples is at least essentially the same and/or comparable to that of the cross section, the deformation layer is removed. The deformation layer can be removed stepwise, for example several nanometers per step, and the comparison can be carried out after each removal step. One approach for the determination of the open surface porosity is explained below.

Additionally or alternatively, the deformation layer can be removed in subsequent steps of, for example, several nanometers per step and after each step, the total pressure drop is measured and compared to the previous total pressure drop measurements. As long as the deformation layer is not totally removed, the total pressure drop decreases between two subsequent removal steps.

As soon as the deformation layer is entirely removed, the pressure drop remains constant. Accordingly, in addition to other differentiating characteristics discussed herein (e.g., pore size, porosity, etc.), another measure is available to determine with reasonable certainty the boundary between the inner volume and the deformation layer. That is, a sample may be provided that has a deformation layer and an inner volume. The deformation layer may be gradually removed (e.g., by a controlled spark erosion and/or electropolishing operation for series of incremental material removal steps) while simultaneously monitoring pressure drop of a gas passed through the inner volume. The inner volume is reached when pressure drop measurements no longer show any effect caused by the deformation layer (e.g., pressure drop remains constant).

Then FR2 can be measured, which is the difference between the pressure upstream and downstream from the cavity and the adjacent inner volume. Based on these measurements FR1 can be calculated according to the formulae provided above.

As mentioned above, for measurement purposes, the deformation layer will be removed. The thickness of the layer depends mainly on the properties of the porous structure and the way the cavities are produced (milling tool, milling parameters, forces during milling) and may vary in a range between 0.05 mm and 1 mm and preferably 0.1 mm-0.2 mm.

Removing of the deformation layer is preferably be carried out by electropolishing and/or Electrical discharge machining (EDM) and/or by etching. In order to assure that for measurement purposes, the deformation layer is totally removed, sufficient material should be removed. The accompanied reduction of the thickness of the inner volume is preferably neglected for the determination of FR1.

The problem is also solved with an inventive or preferred rotary cylindrical mould member, wherein the average open surface porosity (preferably expressed by % of total area herein) of the outer surface of the deformation layer is from greater than 10% to 40%, and preferably from 15% to 35%. The average open surface porosity of the deformation layer thus may be higher than 10%, 12% or higher, 15% or higher, or 20% or higher. The average open surface porosity of the deformation layer may be 40% or lower, 35% or lower, or 30% or lower.

The disclosure regarding this embodiment of the present invention also applies for the other embodiments and vice versa. Subject matter disclosed in context with this embodiment of the present invention can be included in other embodiments and vice versa.

As seen, numerous of the features involve determination of porosity or dimensions by use of the linear intercept method. More particularly, the skilled person would recognize that use of ASTM-E112-13, and treating "pores" (or any other target for measurement) as a skilled person would treat "grains" in that method, will provide the measurements in accordance with the teachings herein.

For instance, the average open porosity may be determined (for example on the SEM image of a cross section or on SEM surface images). using the techniques of ASTM-E112-13. By way of a general illustration (not intended as a substitute for review of the standard), when applying the linear intercept method, a line is drawn across the image of a porous structure and the length is determined in which the line intercepts pores. The linear porosity is calculated according the following formula:

$$\text{Linear porosity} =$$

$$\text{sum length of the pores intercepted by a line/total length of the line}$$

The linear porosity of the deformation layer is preferably determined at the bottom wall and sidewall, preferably at one or more cross section(s) of the bottom wall and at the sidewall, preferably at one or more locations of the cross section of the sidewall. To determine the porosity in a cross section, the cavity is preferably cut apart.

Preferably, the average porosity (e.g., as measured by the linear intercept method). In a planar section that would be obtained by taking a cross-section orthogonally to a longitudinal axis of the mould drum) of the of the inner volume may be 15-50%, preferably 20-45%. The average porosity of the inner volume thus may be higher than 15% or higher than 20%. The average porosity of the inner volume may be 50% or lower, 45% or lower, or 40% or lower.

According to another preferred or inventive embodiment of the present invention, the average pore size of the inner volume is 30-110 μm, as determined by the linear intercept method. (e.g., as measured in a planar section that would be obtained by taking a cross-section orthogonally to a longitudinal axis of the mould drum).

By way of one illustration, in accordance with the linear intercept method, an average pore size may be, for example, measured by means of the total intercept length (using an image derived from a cross-section of the inner volume), divided by the number of pores as explained according to FIG. 3 in this application.

The disclosure regarding this embodiment of the present invention also applies for the other embodiments and vice versa. Subject matter disclosed in context with this embodiment of the present invention can be included in other embodiments and vice versa.

Preferably, the cavity is a 2D-cavity having an at least essentially curved porous bottom wall and a porous side wall. A 2D-cavity is a cavity that forms products with a constant thickness over their entire width and length. An example for a 2D-product is a disk, a hamburger patty or the like.

According to one embodiment of the present invention, the plastic deformation from the forming of the porous sidewall may be different from (e.g., higher than) the plastic deformation from the forming of the porous bottom wall. This may result in a different (e.g., higher flow resistance) performance or other characteristic of the sidewall in comparison to the bottom wall. The difference in plastic deformation of the sidewall in comparison to the bottom wall may be intended, and may be achieved by different machining techniques.

The difference in plastic deformation from forming of walls may result in a difference in deformation layer thickness, amount of average surface porosity in the wall, average pore size in the deformation layer or any combination thereof as between a deformation layer associated with a sidewall and a deformation layer associated with a bottom wall of a cavity. The value of any such parameter of the side wall deformation layer may be from 0.1 to 3 times, or preferably 0.5 to 1.5 times the value for the bottom wall deformation layer.

According to another inventive or preferred embodiment of the present invention, the cavity is a 3D-cavity comprising at least a contoured bottom wall.

The disclosure regarding this embodiment of the present invention also applies for the other embodiments and vice versa. Subject matter disclosed in context with this embodiment of the present invention can be included in other embodiments and vice versa.

A 3D-cavity allows to produce moulded products with a varying thickness over their width and/or length. A contoured bottom wall will lead to product with one side being 3D-shaped, like an egg-half or a half-sphere or a cylinder cut along its center-axis. Another example for a 3D-product is Chicken Premier. In case the sealing plate is also contoured, 3D-products like a sausage or products with a cross-section being pentagonal, hexagonal, heptagonal or more can be realized. The cross section is perpendicular to a longitudinal extension of the product.

In a preferred embodiment of a 3D-cavity (and preferably also the previously discussed 2D cavity), the average open surface porosity of the deformation layer is 11-40%, preferably 15-35%. (The average open surface porosity of the deformation layer is also the open surface porosity of a wall (bottom wall and/or side wall) of a cavity). The average open surface porosity of the deformation layer may be 11% or higher, 15% or higher, or 20% or higher. The average open surface porosity of the deformation layer may be 40% or lower, 35% or lower, or 30% or lower.

Additionally, or alternatively, pore size of the inner volume is preferably from 10-100 μm. The average pore size may be at least 40 μm, more preferably at least 50 μm. The average pore size may be less than 90 μm, more preferably less than 80 μm.

As with other material characterizations described herein, the following applies explicitly for 2D- and 3D-cavities and particularly to all embodiments of the present invention.

Preferably, the thickness of the deformation layer is 0.05-1 mm, preferably 0.1-0.2 mm.

Preferably, the average total pressure drop per cavity is 300-400 mbar at a flow rate of gas (e.g., an air or $N_2$-flow rate) of 50 ln/min. Preferably, the average total pressure drop per cavity is 120-160 mbar at a flow rate of gas (e.g., an air or $N_2$-flow rate) of 20 ln/min.

It can be seen that it is possible to derive a mould drum having a porous structure which is defined to include a continuous fluid flow path from the inner volume outward through a wall defining the cavity, whereby a fluid passed from the inner volume through the deformation layer exhibits an increased velocity in the deformation layer relative to a velocity of the fluid within the inner volume.

It may also seen that there can be a mould drum with an inner volume and cavities for foodstuff, which include a deformation layer formed by plastic deformation, preferably from a milling operation, and wherein an average flow resistance of the deformation layer (FR1) is different from the average flow resistance of the inner volume (FR2), and/or (i) the average flow resistance of the deformation layer (FR1) is as described elsewhere herein; for example, preferably 1-30%, more preferably 3-20%, still more preferably 4-15%, even more preferably 5-12% of the average flow resistance of the inner volume (FR2). The deformation layer may have an average surface porosity as described elsewhere herein; for example, an average surface porosity that is greater than 11%, and more preferably ranges from 20 to 40%. The inner volume and the deformation layer may each have any of the characteristics as described elsewhere herein for its thickness, porosity, pore size, or other characteristic.

BRIEF DESCRIPTION OF THE DRAWINGS

The inventions are now explained according to the Figures. These explanations apply to all embodiments of the present invention likewise. The explanations do not limit the scope of protection of the present invention.

FIG. 5 is a micrograph of an illustrative cross section of a mould drum.

FIG. 6 is another photomicrograph that illustrates the presence of slip lines, a feature that is characteristic of a deformation layer.

FIG. 7A is a low magnification (30×) microscopic image of a cavity bottom surface.

FIG. 7B is a higher magnification image (200×) of the cavity bottom surface.

DETAILED DESCRIPTION

Figure 1:
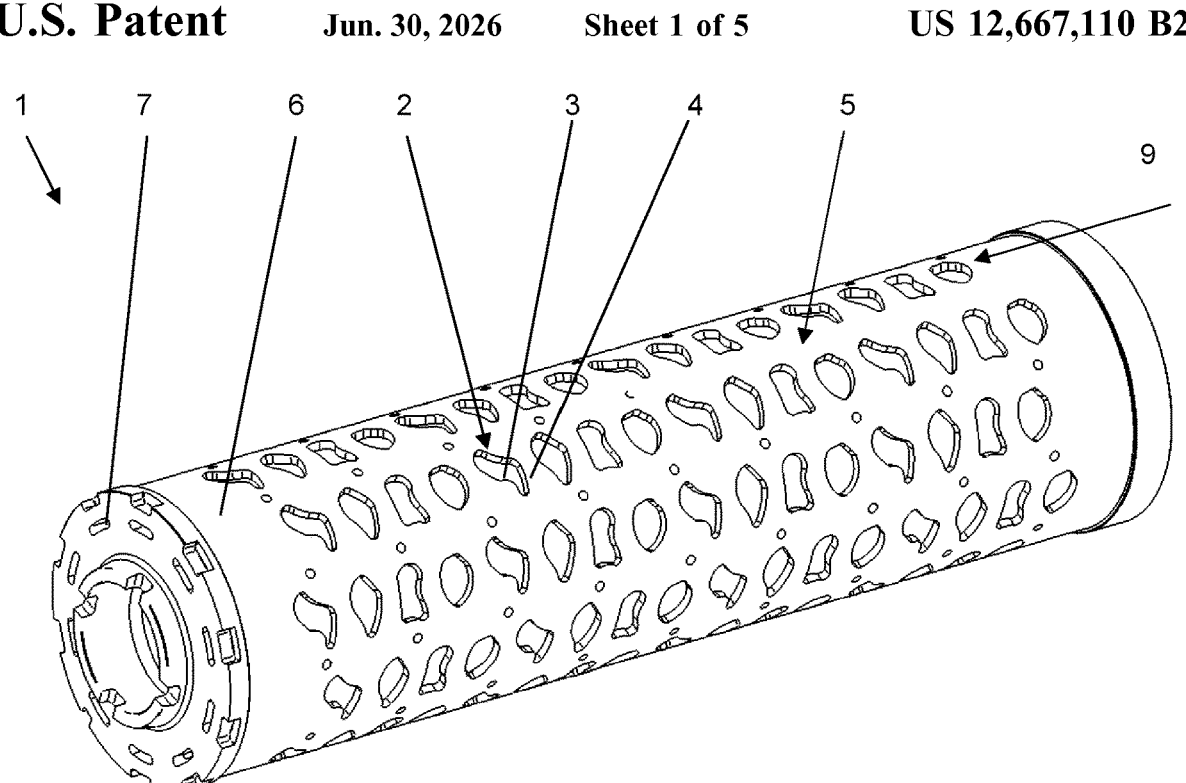
FIG. 1 depicts an inventive mould member.

FIG. 1 shows an inventive cylindrical mould member 1, a drum, which comprises a porous mould body 6, in the present case a cylindrical mould body 6 made from one single piece. The porous mould body 6 is made from a sintered metal material, for example stainless steel, preferably 1.4404. The mould body comprises a plurality of cavities 2 at its outer circumference 5 which have been machined, preferably milled into the porous mould body. The cavities may have but need not have different shapes. The drum 1 rotates during production and in one rotational position, for example the 12 o'clock-position, a mass feed member (not depicted) is positioned in order to fill the cavity and in a downstream position, for example the 6 o'clock-position, a discharge device (not depicted) may be positioned in order to empty the cavity. After the cavity is emptied it can then be refilled again. The cavities are here provided in rows 9, here ten rows, which a plurality of cavities 2, here sixteen cavities, per row. The cavities in one row are filled and emptied simultaneously. The emptying of the cavities is supported by air (or another gas, such as nitrogen), which is forced in the emptying position and/or upstream therefrom through the porous body to eject the moulded products. The cylindrical mould member is therefore provided with passages 7, here one passage per row which extends beneath the porous body below one cavity, the so-called inner volume. In the discharge position, the passage is connected to a fluid source (e.g., an air-supply), which forces fluid (e.g, air or nitrogen) through the passage and the inner volume into the cavity and hence removes the moulded product from the cavity. Each cavity comprises a porous bottom wall 3 and a porous sidewall 4. At the outer circumference 5 of the drum, the pores of the porous mould body are closed, for example by smearing the pores with by deep rolling with a rolling element.

Figure 2:
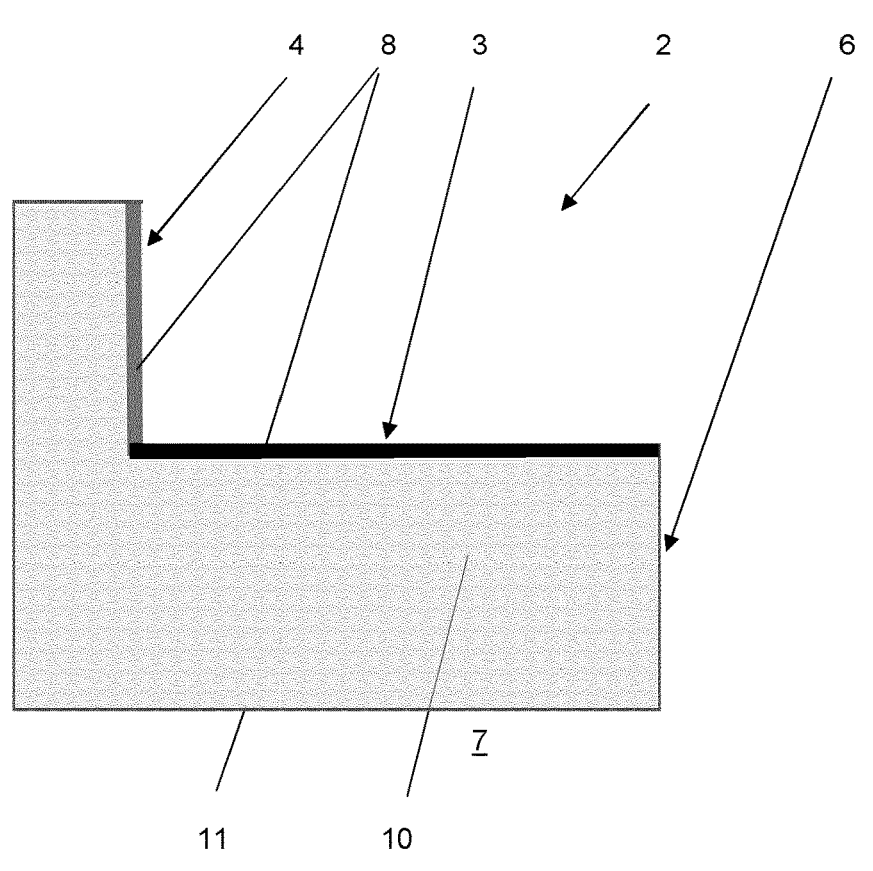
FIG. 2 depicts a cross section of a cavity.

FIG. 2 shows schematically one half of the cross-section of a cavity 2, with a sidewall 4 and a bottom wall 3, which together form the boundary of the cavity, and an inner volume 10 below the cavity. The cavity 2 has been milled into the porous mould body 6. The inner surface 11 of the porous mould body 6 is in contact with the passage 7, which supplies a fluid (e.g., air, nitrogen, another gas or a cleaning fluid) to the cavities 2. As indicated by reference sign 8, during the milling process, a deformation layer is formed at the boundary of the cavity, both at the sidewall 4 and at the bottom wall 3 of the cavity. The deformation layer at the sidewall is preferably different from the deformation layer at the bottom wall, in terms of thickness and/or linear porosity. For removing a product from the cavity 2, a gas, preferably air or nitrogen is supplied via passage 7 (indicated by 7) to the inner surface of the mould body and flows then through the inner volume 10 and is then exited to the cavity 2 via the deformation layer 8 at the sidewall 4 and at the bottom wall 3. The same is true for a cleaning fluid.

Figure 4:
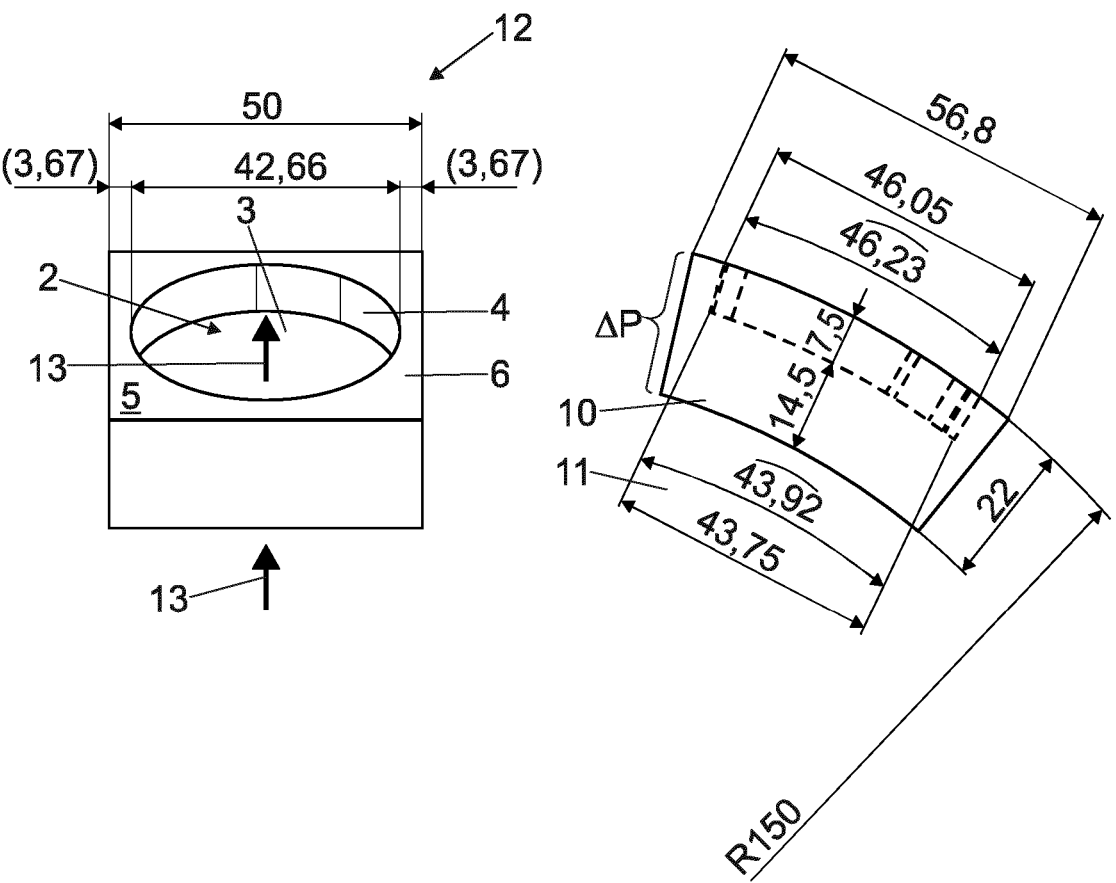
FIG. 4 depicts a test sample cavity.

FIG. 4 depict a test sample cavity 12 which was utilized to acquire the experimental data. All dimensions are provided in [mm]. The porous mould body 6 is made from sintered stainless steel, 1.4404 and is, as can be seen from the Figure on the right hand side, slightly curved. The porous mould body 6 was sealed at its outer circumference 5 and its four sidewalls 14 gastight, here by compressing the porous material at the surface. At the inner surface 11 of the porous mould body no sealing was applied. The area of the surface 11 is here 2348.69 mm². Subsequently, a cavity 2 was machined into the porous mould body, here by milling and starting from the outer circumference 5. The cavity comprises a bottom wall 3, here a curved bottom wall and a sidewall 4. The bottom wall has a surface area of 1472.18 mm² and the sidewall a surface area of 1040.92 mm². Though stated as relatively precise dimensional values, the teachings herein also include relative proportionate dimensional values. Thus, stated another way for this depicted embodiment, it is possible that the proportion of relative surface areas of the bottom wall to the side wall may be 1.4:1. This value may deviate, for example, to a value within a range of 1:1 to 2:1.

The cavity has here a depth of 7.5 mm. After the insertion of the cavity, between the cavity and the inner surface 11 of the porous mould body, the inner volume 11 is left, which has a depth of 14.5 mm. Due to the machining of the cavity, a deformation layer results at its boundary, which is in contact with the product (not depicted).

In order to determine the individual flow resistances FR1 and FR2 of the deformation layer 8 and the inner volume 10, first of all, the total flow resistance $FR_{Total}$ of both, the deformation layer 8 and the inner volume 10, is determined by measuring the pressure drop ΔP of a steady state gas flow Q, preferably air or nitrogen, across the porous mould body from the inner surface 11 to the cavity 2, as depicted by arrow 13. The total pressure drop includes the pressure drop of the constant gas flow while passing the inner volume and the deformation layer 8. The pressure drop is averaged over the entire cavity, i.e. over the entire test sample cavity, both bottom and sidewall. In the present case, only the pressure of the gas below the surface 11 is measured and it is assumed that the pressure of the gas downstream from the compressed layer 8 is ambient pressure, which is subtracted from the measured pressure at the surface 11 to calculate ΔP. The total flow resistance is then calculated with the equation:

$$FR_{Total} = \Delta P/Q$$

wherein ΔP is the pressure drop over the inner volume and the deformation layer and Q is the corresponding gas flow. The pressure drop is for example provided in [mbar]. Q is the gas flow rate at steady state, constant conditions provided in [ln/min]. "ln" is a volume at standard condition. i.e. 0° C. and 1 bar.

Subsequently, the compression layer 8 is removed, for example by electro polishing and/or EDM and then the flow resistance is again determined at the same gas flow rate Q in [ln/min] used to measure the total pressure drop, in order to determine the pressure drop $\Delta P_2$ across the inner volume. This data is used to calculate the flow resistance FR2 of the inner volume utilizing the formula:

$$FR_2 = \Delta P_2/Q$$

wherein $\Delta P_2$ is the pressure drop of the inner volume and Q is the identical gas flow in [ln/min] used to measure ΔP.

The flow resistance FR1 can then be calculated as follows:

$$FR1 = FR_{Total} - FR2.$$

The flow resistances are preferably measured in a range of 2-100 [ln/min], preferably 5-50 [ln/min]. The selected gas is preferably air or nitrogen. Preferably, the measurements are taken at a range of different volume-flows, for example in steps of 10 [ln/min], from 10-50 [ln/min]. All data is acquired with a constant gas flow; i.e. the gas flow does not vary during the measurement (static flow conditions).

Figure 3:
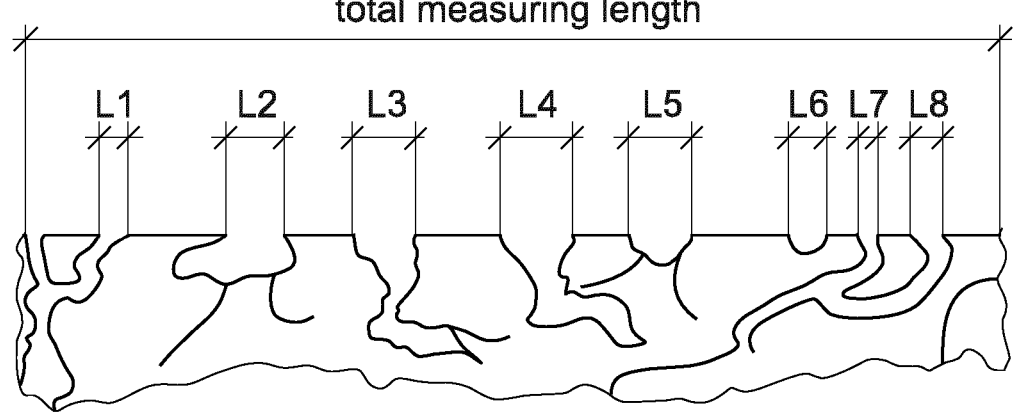
FIG. 3 depicts the determination of the linear porosity and linear pore intercept length.

According to FIG. 3, the determination of the linear porosity with the linear intercept length is illustrated, (to demonstrate summarily the linear intercept method as it is described in ASTM-E112-13). The schematic graph depicts a porous cross-section, along which an artificial line is drawn, with the total measuring length [mm]. The drawing depicts what a skilled person may see upon examination of a photomicrograph created using conventional metallographic techniques. The technique described can be performed using a photomicrograph of a metallographic specimen prepared using conventional techniques for analysis of densified powder metal parts. In the present case, this line intersects 8 pores. The length of the interception L1-L8 is measured individually per pore and the sum ΣL1-L8 is calculated and then divided by the total measuring length which results in the linear porosity. This procedure can be repeated several times and an average for the compression layer 8 and an average for the inner volume can be determined. The linear intercept length can be applied to the image of the surface of the deformed lager and/or to a cross-section of the porous mould body, in the deformed layer and/or in the inner volume.

This approach can be used to determine the average linear intercept Length, which is equivalent to the average pore size so that the disclosure above also applies. The equation to calculate the average intercept length is also provide in FIG. 3.

FIG. 5 is an annotated photomicrograph that illustrates portions of a cross section of a mould drum having a cavity and an inner volume. An exposed cavity bottom surface is depicted. Extending from the cavity bottom surface there is a deformation layer, and below that is the inner volume. It can be seen that the deformation layer in this micrograph is characterized by a markedly lower amount of porosity than the inner volume.

FIG. 6 is another annotated photomicrograph that depicts the presence of slip lines (following subjecting the sample to a suitable etch and then examining by scanning electron microscope). The presence of slip lines is a feature that may be expected to be within a deformation layer, but not within an inner volume of a mould drum in accordance with the present teachings. As can be seen in FIG. 6, progressing inwardly, away from the surface of the cavity wall, the presence of slip lines diminish and ultimately disappear.

FIG. 7A shows low magnification (30×) and FIG. 7B shows a higher magnification (200×) scanning electron microscope photomicrographs to illustrate open porosity in a cavity wall surface (e.g., a cavity bottom wall). A network of interconnecting pores can be seen penetrating into the mould body toward the inner volume.

LIST OF REFERENCE SIGNS 1 cylindrical mould member, drum
2 porous product cavities
3 porous bottom wall
4 porous sidewall
5 outer circumference
6 mould body
7 passages
8 deformation layer
9 row of cavities
10 inner volume
11 inner surface
12 test sample cavity
13 gas flow
14 sidewall of the test sample
FR1 flow resistance of the deformation layer
FR2 flow resistance of the inner volume
$FR_{Total}$ total flow resistance FR1+FR2
ΔPressure drop measurement

The invention claimed is:

1. A rotary cylindrical mould member for moulding products from a food starting material comprising poultry, pork, meat-replacement and vegetarian food, the mould member having a longitudinal axis and an outer circumference, the mould member comprising at least one mould body having a curved outer surface forming at least part of the outer circumference of the mould member and an opposite inner surface, wherein the at least one mould body is made from a porous material with a porous structure of intercommunicating pores, wherein the outer circumference is at least partially sealed airtight, wherein the at least one mould body comprises at least one mould cavity in which the food starting material is moulded, the at least one mould cavity being formed in the curved outer surface, the at least one mould cavity comprising a porous bottom wall, a porous sidewall, and a boundary, wherein at least one of the porous bottom wall, the porous sidewall, and the boundary comprises a deformation layer formed by plastic deformation; from a milling operation, the at least one mould body comprises an inner volume between the deformation layer and the inner surface, the mould member further comprising a gas supply which forces a fluid gas through the inner volume and the deformation layer into the at least one mould cavity to assist with removal of moulded products from the at least one mould cavity, wherein an average flow resistance of the deformation layer (FR1) is 1%-30% of an average flow resistance of the inner volume (FR2).

2. The rotary cylindrical mould member according to claim 1, wherein an average porosity of the inner volume is 15%-50% by volume.

3. The rotary cylindrical mould member according to claim 1, wherein an average pore size of the inner volume is 10 μm-100 μm determined using a linear intercept method.

4. The rotary cylindrical mould member according to claim 1, wherein the at least one mould cavity is a 2D, wherein the porous bottom wall is curved.

5. The rotary cylindrical mould member according to claim 4, wherein an average open surface porosity of the deformation layer is greater than 10%.

6. The rotary cylindrical mould member according to claim 1, wherein the plastic deformation of the porous sidewall is higher than the plastic deformation of the porous bottom wall.

7. The rotary cylindrical mould member according to claim 1, wherein the at least one mould cavity is a 3D-cavity comprising at least-a contoured bottom wall.

8. The rotary cylindrical mould member according to claim 7, wherein an average porosity of the deformation layer is 10%-50%.

9. The rotary cylindrical mould member according to claim 1, wherein an average thickness of the deformation layer is 0.05 mm-1 mm.

10. The rotary cylindrical mould member according to claim 1, wherein a total average pressure drop (FR1+FR2) per mould cavity is 300 mbar-400 mbar.

11. The rotary cylindrical mould member according to claim 1, wherein a total average pressure drop (FR1+FR2) per mould cavity is 120 mbar-160 mbar.

12. The rotary cylindrical mould member according to claim 1, wherein a total average flow resistance (FR1+FR2) is 102%-120% of the average flow resistance of the inner volume (FR2).

13. The rotary cylindrical mould member according to claim 1, wherein the porous structure defines a continuous fluid flow path from the inner volume outward through the porous bottom wall and/or the porous sidewall of the at least one mould cavity such that a venturi effect is produced through the deformation layer, whereby the fluid passing from the inner volume through the deformation layer exhibits an increased velocity in the deformation layer relative to a velocity of the fluid gas within the inner volume.

* * * * *